United States Patent Office 2,938,329
Patented May 31, 1960

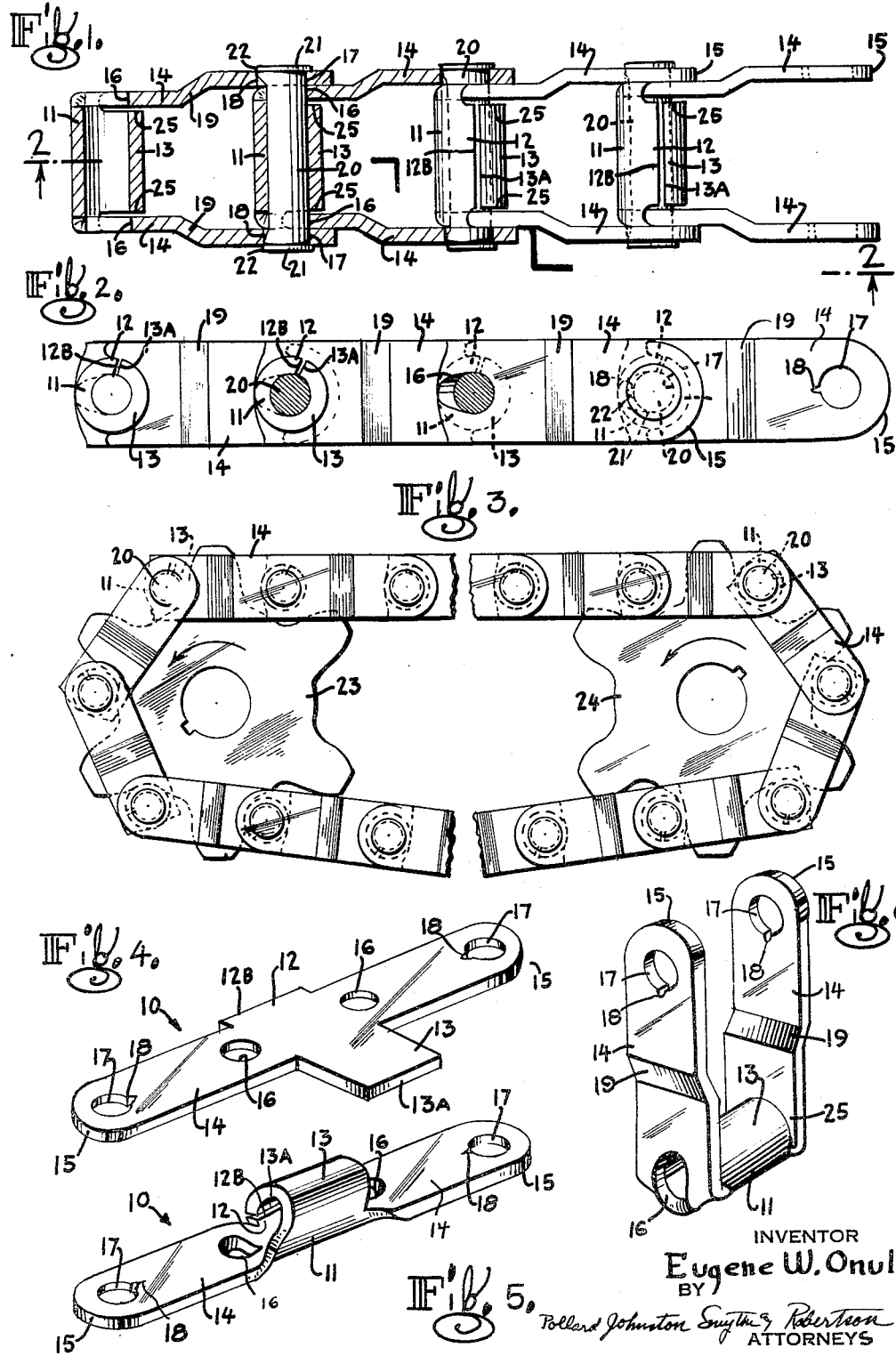
May 31, 1960     E. W. ONULAK     2,938,329
CHAIN LINK
Original Filed April 29, 1954     2 Sheets-Sheet 1
INVENTOR
Eugene W. Onulak
BY Pollard Johnston Smythe & Robertson
ATTORNEYS

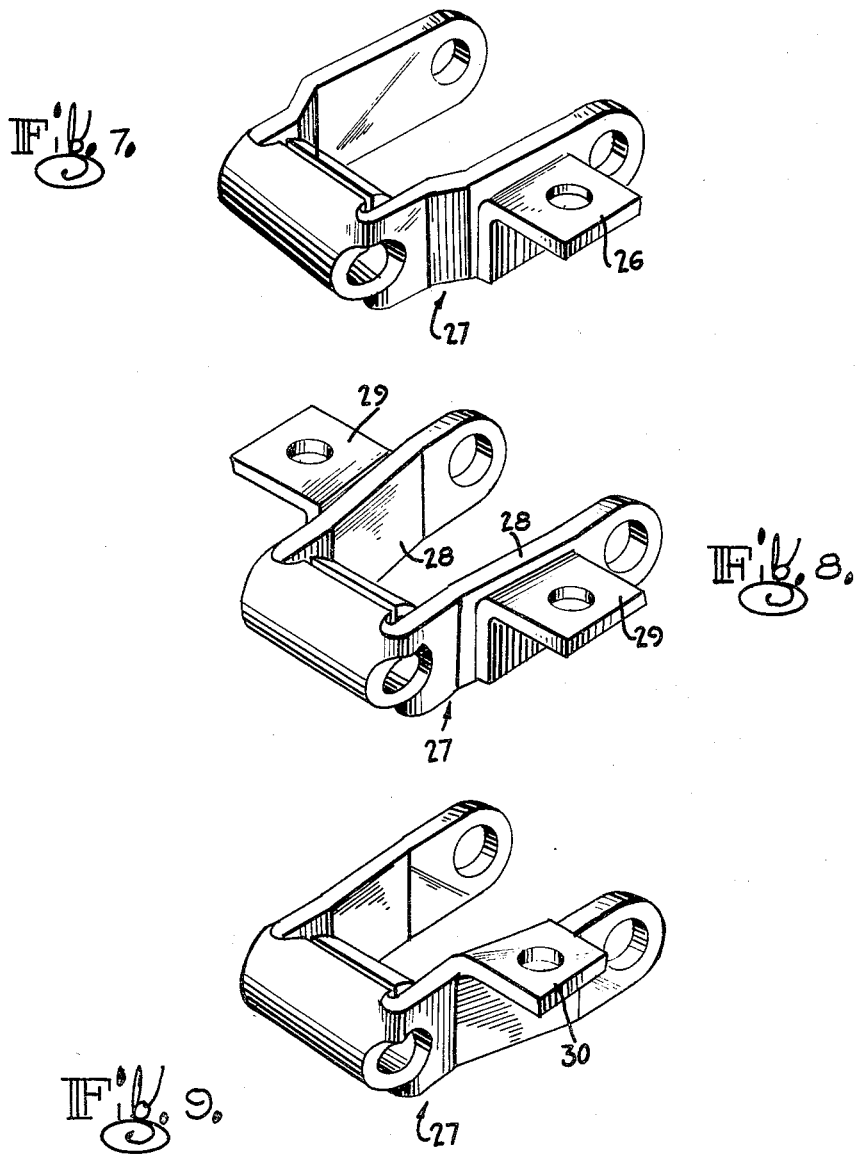

2,938,329

CHAIN LINK

Eugene W. Onulak, Trumbull, Conn., assignor to The Locke Steel Chain Company, Bridgeport, Conn., a corporation of Connecticut Original application Apr. 29, 1954, Ser. No. 426,393, now Patent No. 2,793,536, dated May 28, 1957. Divided and this application Mar. 15, 1957, Ser. No. 646,273

3 Claims. (Cl. 59—8)

The present invention relates to the method of forming drive and conveyor sprocket chains and particularly to the method of forming a sheet metal chain link.

Relatively inexpensive chains suitable for many types of transmission and conveying purposes are in demand. Frequently, chains will be used under difficult running conditions where maintenance must be reduced and also will be used under outdoor conditions where abrasion factors become a problem, including those caused by the weather. These chains must have sufficient strength and wearing properties for the purpose and yet must be easily fabricated. Further, it is desirable to provide a chain which can be used with cast sprockets as compared with precision made gearing.

One of the primary objects of the present invention is to provide a chain link which can be inexpensively produced.

Another object of the invention is to provide chains which can be economically constructed in a variety of pitches and tensile strengths.

A still further object of the invention is to provide a chain designed so as to permit use of attachment links.

A still further object of the invention is to provide a chain useable with inexpensive or cast sprockets.

A still further object of the invention is to provide a sprocket chain having a closed bearing bushing through which a link pin can be passed, the outside surface of the bushing forming a uniform surface back and front for contact with the teeth of sprocket wheels.

A still further object is to produce a pintle or pin chain from flat sheet metal with a completely closed barrel or bushing.

The chain link can be made from a flat piece of sheet metal bent into U-shape, the legs of the U facing each other and being joined by a connecting portion at the base of the U, the connecting portion being rounded to form a tubular bushing which extends between the legs and into the space toward the open part of the U. Preferably, but not necessarily, the bushing is cylindrical. Any type of metal can be used, such as steel or other suitable metal.

In a preferred aspect, the tubular bushing can be formed from a tab means which is part of the flat metal stock, the tab means being bent or curled around so as to form the complete cylindrical bushing and to be integral with the connecting portion. There may be a tab bent around from one side or there may be tabs bent from both sides.

In a link made in accordance with the invention herein, the side arms of the link and the connecting portion will serve to properly distribute the stresses involved. Also, it is desirable to correlate the shape of the apertures in the side arms and their width relative to the width of the strip so that the proper amount of material will be present to give the required strength. The design is such that there will be obtained the desired tensile strengths with the minimum amount of material. Furthermore, the metal used may have an oriented grain structure.

In the operation of chain in conjunction with sprockets of the type described herein, the teeth of the driving sprocket wheel engage the back surfaces of the cylindrical bushings to impart movement to the chain while the teeth of the driven sprocket wheel are engaged by the front surfaces of the bearing bushings so that rotation is imparted to the sprocket wheel by the chain.

Other objects, advantages and features of the invention will become apparent from the following description and drawings, which are merely exemplary.

In the drawings:

Fig. 1 is a plan view of a length of chain formed of links according to the invention, certain of the links being shown in horizontal section;

Fig. 2 is a side elevation of the length of chain as seen in Fig. 1, and shown partially in vertical section taken along the line 2—2 of Fig. 1;

Fig. 3 is a side elevation, partially broken away, showing a sprocket chain according to the invention engaged over driving and driven sprocket wheels, the chain being on a reduced scale from that shown in Figs. 1 and 2;

Fig. 4 is a perspective view showing one manner of making a link by using a flat sheet metal blank;

Fig. 5 shows the blank as seen in Fig. 4 partially formed into link form, the intermediate bearing bushing portion being formed into a cylindrical or tubular shape;

Fig. 6 is a perspective view showing the completed link with the side arms bent upwardly with respect to the intermediate bearing bushing portion;

Fig. 7 is a perspective view of an attachment link;

Fig. 8 is a perspective view of another attachment link arrangement; and

Fig. 9 is a perspective view of a still further attachment link wherein the link and lug are formed from one piece.

This application is a division of my application Serial No. 426,393, filed April 29, 1954, now Patent No. 2,793,536 which is a continuation-in-part of my application Serial No. 390,393, filed November 5, 1953, and now abandoned.

Referring to the drawings, the drive and conveyer sprocket chain, according to the illustrated exemplary embodiment of the invention, comprises a series of hingedly connected links, each being produced of sheet metal formed and bent to shape. Preferably, each link is produced from a flat sheet metal blank 10, as shown in Fig. 4, consisting of an intermediate portion 11 having a short transverse projection or tab 12 at one side and a relatively long transverse projection or tab 13 at the other side, and which is adapted as will presently more fully appear to be formed and bent into a tubular or cylindrical shape to constitute a bearing bushing, and end or leg portions 14—14 which are adapted to be bent relatively to the intermediate portion to provide the facing side arms or legs of the link, the link being of generally U-shape. The ends of the blank are rounded as at 15—15 and each of the leg portions 14 is provided with a pair of hinge pin receiving holes 16 and 17, the hole 16 being adjacent the edge of the U and the hole 17 being adjacent the outer end. The hole 17 may be provided with a notch 18 for the purpose of interlocking engagement of the hinge pin, as will presently more fully appear.

As shown in Fig. 5, the intermediate or connecting portion 11 is formed and bent into cylindrical or tubular form, the portion in longitudinal line with the hole 16 being depressed with respect to the planes of the end portions 14—14, and the projection or tab 13 then being curled or rounded into substantially butted relation with the tab 12 to complete the tubular form of the bearing bushing portion of the link. The legs of the link are provided by then bending the end portions 14—14 substantially at right angles to the axis of the tubular bearing bushing portion, as shown in Fig. 6, so that their inner surfaces are contiguously adjacent each end thereof and the holes 16 are in axial line with the tubular passage therethrough, the bearing bushing portion being thus disposed in the space between the side arms. Preferably, the passage is cylindrical. The bushing outside diameter illustrated in section in Fig. 2 is less than the width of the legs but by increasing the length of the tab 12 and/or 13, the bushing can be made larger or smaller as is needed for the particular application. For example, the outside diameter of the bushing can be made the same or more than the width of the legs.

The side arms or legs may be provided intermediate their ends with offset bends 19—19 which offset the outer ends of the side arms from the inner ends approximately the thickness of the sheet metal, so that the outer ends of one link may be engaged about the inner ends of an adjacent link. In this latter relation, the holes 17 are brought into axial register with the holes 16 and the passage through the bearing bushing portion, and the adjacent links are hingedly connected by a hinge pin 20 which is passed through the registered holes and the bearing bushing portion, this hinge pin being fixed with respect to the holes 17 by having its ends swaged, as at 21, to prevent axial displacement, and having lugs 22—22 produced by the swaging action engaged within the notches 18—18 to thus fix the pin against turning movement. The pin has free turning movement within the holes 16 and the bearing bushing.

To facilitate bending and manufacture and to eliminate possibility of fractures and undesirable stresses when using some materials a slight indentation or scoring can be made at or adjacent the junction of the tabs with the legs. For some conditions, it may be desirable to proportion the length of the tab 13 relative to the diameter of the bushing so that when formed edge 13A will lock with the mating edge 12B.

As the chain moves over these sprocket wheels, normally the teeth of the driving wheel 23 bear upon the back surfaces of the bearing bushing portions while the teeth of the driven wheel 24 are engaged by the front surface. In each case the bushing presents a uniformly cylindrical outside bearing surface to the sprocket wheels.

It is pointed out that, if desired, the short tab 12 may be omitted, in which case the one edge of the blank 10 will be continuously straight, and the length of the extension portion 13 may be correspondingly increased, so that the latter, together with the intermediate portion 11 in line with the arm forming portions 14, will be formed and bent to provide the cylindrical bearing bushing.

The apertures 16 and the material adjacent thereto may be designed to provide the desired tensile properties and to permit proper bending of the legs from the flat stock form. The inner surfaces or edges 25 normally will be spaced slightly from the side arms or legs 14. Such a separation facilitates heat treatment of the link when joined to another link because the heat can more readily penetrate to the inner surfaces.

In a further form of the invention, as illustrated in Fig. 7, the legs or side arms can be provided with lugs or attachment points 26 so as to form attachment links. Such a link can be used to provide mountings for flights, buckets, paddles and the like for conveying material. In the form shown in Fig. 7, lug 26 may be welded to the leg of link 27, link 27 being similar to the link previously described. Another form is seen in Fig. 8, the legs 28 being shaped as needed to receive lugs 29 which may be welded thereto. As illustrated in Fig. 9, the attachment link also may have lug 30 formed integral therewith.

It should be apparent that details of construction and form can be varied, including the manner of forming the tubular bushing by bending or by welding or integrally joining a part thereto, without departing from the spirit of the invention except as defined in the appended claims.

What is claimed is:

1. A method of forming a U-shaped chain link having parallel leg portions and an integral cylindrical bushing therebetween from a flat sheet metal blank having an intermediate portion, a tab extending from said intermediate portion, and a pair of leg-forming portions extending from said intermediate portion in opposite directions and perpendicular to the direction of said tab, comprising the steps of depressing the intermediate portion relative to the remainder of the blank, then curling the tab until it forms a cylindrical bushing in conjunction with the depressed portion, and then bending the leg-forming portions about their junctions with said depressed portion to a position substantially at right angles to said cylindrical bushing so that substantially all of said bushing is between said leg portions.

2. A method of forming a U-shaped chain link and an integral cylindrical bushing therebetween from a flat sheet metal blank having an intermediate portion, a tab extending from said intermediate portion, and a pair of leg-forming portions extending from said intermediate portion in opposite directions and perpendicular to the direction of said tab, comprising the steps of depressing the intermediate portion relative to the remainder of the blank, then curling the tab until it abuts the opposite edge of the intermediate portion so that the tab and the intermediate portion form a cylindrical bushing, and then bending the leg-forming portions about their junctions with said depressed portion to a position substantially at right angles to said cylindrical bushing so that substantially all of said bushing is between said leg portions.

3. A method of forming a U-shaped chain link having parallel leg portions and an integral cylindrical bushing therebetween from a flat sheet metal blank having an intermediate portion, a tab extending from said intermediate portion in one direction, a shorter tab extending from said intermediate portion in an opposite direction, and a pair of leg-forming portions extending from said intermediate portion in opposite directions and perpendicular to the direction of said tabs, comprising the steps of depressing the intermediate portion relative to the remainder of the blank, then curling the longer tab and the shorter tab until they abut so that the two tabs in conjunction with the depressed portion form a cylindrical bushing, and then bending the leg-forming portions about their junctions with said depressed portion to a position substantially at right angles to said cylindrical bushing so that substantially all of said bushing is between said leg portions.

References Cited in the file of this patent

UNITED STATES PATENTS

| | | |
|---|---|---|
| 1,448,663 | Hoya | Mar. 13, 1923 |
| 1,456,862 | Berry | May 29, 1923 |
| 1,584,793 | Morehead et al. | May 18, 1926 |
| 1,605,593 | Kiss-Ecsegi | Nov. 2, 1926 |
| 1,620,603 | Munson | Mar. 8, 1927 |
| 1,649,486 | Habart | Nov. 15, 1927 |
| 2,272,837 | Getz et al. | Feb. 10, 1942 |
| 2,300,089 | Auburn | Oct. 27, 1942 |
| 2,758,483 | David | Aug. 14, 1956 |

FOREIGN PATENTS

| | | |
|---|---|---|
| 11,357 | Great Britain | 1896 |